United States Patent
Cha et al.

(10) Patent No.: US 7,848,755 B2
(45) Date of Patent: Dec. 7, 2010

(54) METHOD FOR RECOVERING ARQ DATA IN WIRELESS PORTABLE INTERNET SYSTEM

(75) Inventors: Jae-Sun Cha, Daejeon (KR); Chul-Sik Yoon, Daejeon (KR)

(73) Assignees: Samsung Electronics Co., Ltd. (KR); Electronics and Telecommunications Research Institute (KR); KT Corporation (KR); SK Telecom Co., Ltd. (KR); Hanaro Telecom., Inc. (KR)

( * ) Notice: Subject to any disclaimer, the term of this patent is extended or adjusted under 35 U.S.C. 154(b) by 951 days.

(21) Appl. No.: 11/604,071

(22) Filed: Nov. 24, 2006

(65) Prior Publication Data

US 2007/0133470 A1    Jun. 14, 2007

(30) Foreign Application Priority Data

Nov. 24, 2005   (KR) ...................... 10-2005-0112767

(51) Int. Cl.
    *H04W 36/00*     (2009.01)
(52) U.S. Cl. ........................ 455/436; 455/438; 455/440; 370/328
(58) Field of Classification Search .................. 370/371, 370/395.52, 394, 328, 239, 338, 473, 229, 370/370, 230, 235, 277, 278, 282; 455/436, 455/438, 440, 442, 443, 445, 432.1, 524, 455/525, 456.6
See application file for complete search history.

(56) References Cited

U.S. PATENT DOCUMENTS

| | | | | |
|---|---|---|---|---|
| 6,424,625 B1 * | 7/2002 | Larsson et al. | ............... | 370/236 |
| 6,611,547 B1 * | 8/2003 | Rauhala | ...................... | 370/331 |
| 7,299,030 B2 * | 11/2007 | Jung | .......................... | 455/406 |
| 2003/0128681 A1 * | 7/2003 | Rauschmayer | ............... | 370/338 |
| 2005/0114489 A1 * | 5/2005 | Yonge et al. | ................. | 709/223 |
| 2005/0141477 A1 * | 6/2005 | Tomita et al. | ............... | 370/349 |
| 2005/0195822 A1 * | 9/2005 | Lim et al. | ................... | 370/393 |
| 2005/0270975 A1 * | 12/2005 | Meylan et al. | ............... | 370/229 |
| 2007/0266292 A1 * | 11/2007 | Korndewal et al. | .......... | 714/749 |
| 2008/0101290 A1 * | 5/2008 | Sung et al. | .................. | 370/331 |

* cited by examiner

*Primary Examiner*—Kamran Afshar
*Assistant Examiner*—Marisol Fahnert
(74) *Attorney, Agent, or Firm*—The Farrell Law Firm, LLP (57) ABSTRACT

In an Automatic Repeat reQuest (ARQ) method for recovering ARQ data by a target base station when handover of a mobile terminal is performed from a serving base station to the target base station in a portable Internet system is provided. First ARQ data, which includes a first service data unit (SDU), a first ARQ block sequence number, and a first sub-ARQ block sequence number, that are buffered in the serving base station are received and second ARQ data, which includes a second SDU, are received from the serving base station. The received first SDU is divided into ARQ blocks and is transmitted to the mobile terminal; and the received second SDU is divided into the ARQ blocks and is transmitted to the mobile terminal.

7 Claims, 6 Drawing Sheets

METHOD FOR RECOVERING ARQ DATA IN WIRELESS PORTABLE INTERNET SYSTEM

PRIORITY

This application claims priority to Korean Patent Application No. 10-2005-0112767 filed in the Korean Intellectual Property Office on Nov. 24, 2005, the contents of which are incorporated herein by reference.

BACKGROUND OF THE INVENTION

1. Field of the Invention

The present invention relates to an Automatic Repeat reQuest (ARQ) data recovery method, and more particularly, to an ARQ data recovery method for preventing data loss when handover is generated in a portable Internet system.

2. Description of the Related Art

A portable Internet system using a wireless transmission scheme for guaranteeing spectrum usage efficiency in a 2.3 GHz frequency bandwidth has a cellular-type network configuration, and it may efficiently use the uplink/downlink asymmetry transmission characteristics of an IP-based wireless service.

Figure 1:
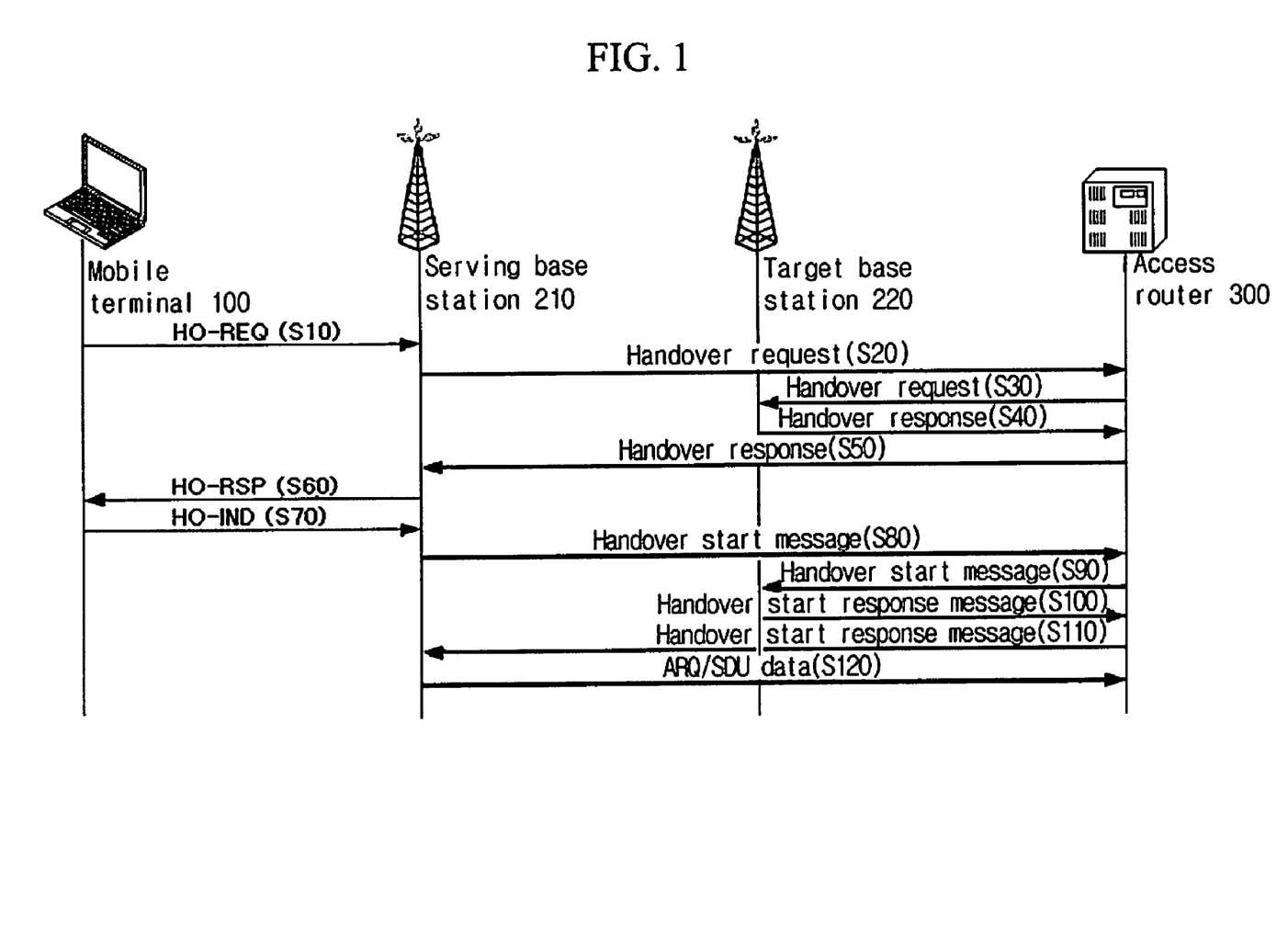
FIG. 1 shows a flow diagram of a handover process in a conventional portable Internet system.

FIG. 1 shows a flow diagram of a handover process in a conventional portable Internet system;

As shown in FIG. 1, a mobile terminal 100 wirelessly accesses a base station to receive a service from a portable Internet network, and the base station that mobile terminal 100 accessed becomes a serving base station 210. Mobile terminal 100 measures a radio signal from serving base station 210 and neighboring base stations to reliably communicate with serving base station 210. In this case, when a quality of the radio signal received from serving base station 210 is lower than a quality of the radio signal received from a neighboring base station by a threshold value suggested in a handover algorithm realized in mobile terminal 100, mobile terminal 100 determines performing the handover to the neighboring base station.

Mobile terminal 100 uses a handover request HO-REQ message to request a handover from serving base station 210 in step S10. Serving base station 210 receiving the HO-REQ message requests the handover of mobile terminal 100 from an access router 300 in step S20, and access router 300 requests the handover from a neighboring base station having a radio signal threshold value that is greater than that of serving base station 210 in step S30.

The neighboring base station receiving the handover request in step S30 becomes a recommended target base station, and the recommended target base station transmits a response to the handover request to access router 300 in step S40. Access router 300 receiving the handover response transmits a response to the handover to serving base station 210 in step S50. Serving base station 210 receiving the handover response uses a handover response message HO-RSP to transmit information of the recommended target base station (i.e., a target base station 220) to mobile terminal 100 in step S60.

Mobile station 100 receiving a final handover notification transmits a handover indication message HO-IND to serving base station 210 in step S70. After the HO-IND message is transmitted to serving base station 210, serving base station 210 transmits a handover start message in step S80 to inform access router 300 that the handover is actually performed.

Access router 300 receiving the handover start message from serving base station 210 transmits the handover start message to target base station 220 in step S90. After receiving the handover start message from access router 300, target base station 220 transmits a response message of the handover start message to access router 300 in step S100 in response to the handover start message.

After receiving the response message of the handover start message from target base station 220, access router 300 changes the routing table in access router 300 and transmits the response message to serving base station 210 in step S110 so that transmissions to mobile terminal 100 are transmitted to target base station 220 rather than serving base station 210. Serving base station 210 receiving the response message transmits Automatic Repeat reQuest (ARQ) data or Service Data Unit (SDU) data to access router 300 in step S120 to transmit the ARQ or SDU data to selected target base station 220.

In the above conventional handover process, Internet Protocol (IP) packets, which are transmitted to serving base station 210 and are buffered to be transmitted to mobile terminal 100 but are not transmitted to mobile terminal 100, are transmitted to target base station 220 through access router 300 by using an IP routing function. However, when some ARQ blocks of all the ARQ blocks corresponding to one SDU are transmitted to mobile terminal 100, IP header information may be lost in the ARQ blocks. In that case, some IP packets may not be transmitted to the target base station by using the IP routing function, and a data loss may be problematically generated when the handover is performed.

When the SDU, which embodies the ARQ blocks, is stored in serving base station 210, the ARQ data may be recovered by transmitting information of the corresponding SDU and a sequence number of the ARQ blocks that has been transmitted without any error to target base station 220. However, in this case, since it is difficult to determine which part of the corresponding SDU corresponds to the sequence number of the transmitted ARQ block, it is required to reset the ARQ state in target base station 220 and mobile terminal 100 after the handover is performed, and the transmitted ARQ blocks may be transmitted again. Therefore, radio efficiency may be deteriorated, and the entire handover delay time is problematically increased.

The above information disclosed in this Background section is only for a better understanding of the background of the invention and therefore may contain information that is not prior art to a person of ordinary skill in the art.

SUMMARY OF THE INVENTION

The present invention provides a method for recovering Automatic Repeat reQuest (ARQ) data in a handover process by using an ARQ block sequence number for controlling the ARQ operation and the additional sub-ARQ block sequence number so that the ARQ data may be retransmitted from the target base station without error after the handover process is performed.

According to one aspect of the present invention, a method for recovering ARQ data by a target base station when handover of a mobile terminal is performed from a serving base station to the target base station in a portable Internet system is provided. A first ARQ data buffered in the serving base station is received, and the first ARQ data includes a first SDU. A second ARQ data is received from the serving base station, and the second ARQ data includes a second SDU. The received first SDU is divided into first ARQ blocks and at least first one of the first SDU is transmitted to the mobile terminal. The received second SDU is divided into second ARQ blocks, and the second ARQ blocks are transmitted to the mobile terminal. The first ARQ data further includes one of first ARQ block sequence numbers for the first ARQ blocks, and one of first sub-ARQ block sequence numbers for the first ARQ blocks.

According to another aspect of the present invention, a medium having instructions for causing a target base station to execute a method is provided for recovering ARQ data when a mobile terminal performs handover from a serving base station to the target base station. The method includes receiving an ARQ data buffered in the serving base station, and the ARQ data is contained within an SDU. The method further includes dividing the received SDU into ARQ blocks, and transmitting at least one of the ARQ blocks to the mobile terminal. The ARQ data further includes one of ARQ block sequence numbers for the ARQ blocks.

BRIEF DESCRIPTION OF THE DRAWINGS

The above and other objects, features and advantages of the present invention will become more apparent from the following detailed description of the preferred embodiments of the present invention, taken in conjunction with the accompanying drawings in which.

DETAILED DESCRIPTION OF THE EMBODIMENTS

In the following detailed description, only certain preferred embodiments of the present invention are shown and described, simply for illustrative purposes. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Figure 2:
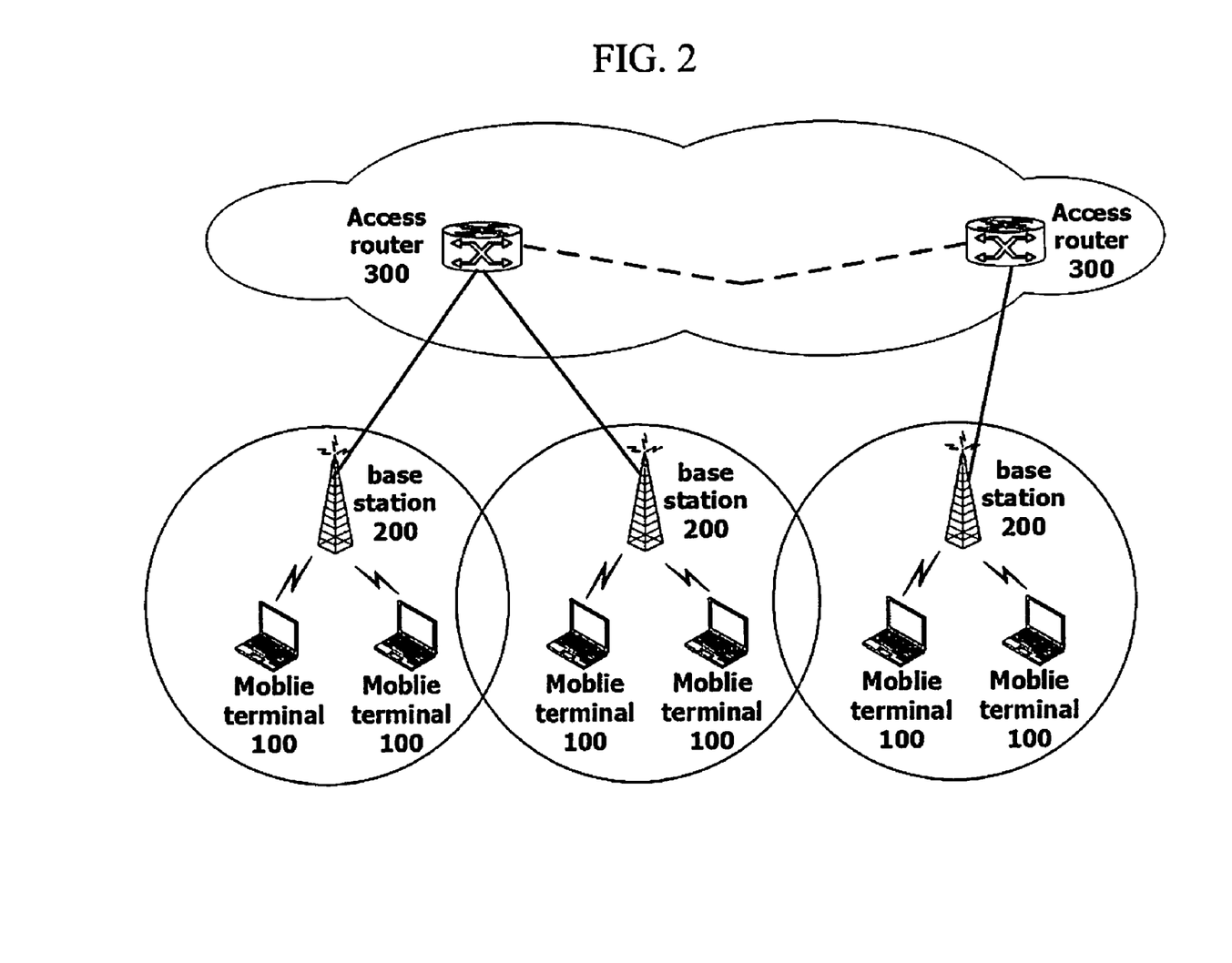
FIG. 2 is a diagram of a network configuration of a conventional portable Internet system.

As shown in FIG. 2, an access network of the portable Internet system includes a mobile terminal 100, a base station 200, and an access router 300. In general, base station 200 performs the control function for controlling a wireless interface and transmitting data through the wireless interface, and access router 300 performs functions for managing network interface and packet routing.

Some manufacturer specific functions such as ARQ control function may be factory installed in access router 300. That is, base station 200 includes all media access control (MAC) functions, but it is not limited thereto.

Mobile terminal 100 may access a portable Internet network through base station 200, and base station 200 performs radio resource management, authentication, and mobility management functions for the access of mobile terminal 100 to the portable Internet network. Accordingly, data transmitted to mobile terminal 100 are buffered in base station 200, and are transmitted to mobile terminal 100. In addition, since base station 200 divides downlink data for the ARQ transmission into ARQ blocks and reassembles the uplink received ARQ blocks, the divided ARQ blocks are buffered and stored in base station 200 before they are transmitted to mobile terminal 100. Mobile terminal 100 accesses a wired network by access router 300, and for this purpose, access router 300 performs mobility management and packet routing management functions.

A method for exchanging data between mobile terminal 100 and base station 200 in an Internet Protocol (IP)-based portable Internet system is classified into two states including an ARQ operation activated state and an ARQ operation deactivated state.

In the ARQ operation deactivated state, IP packets transmitted to the portable Internet access network (i.e., a service data unit (SDU)) are transmitted to mobile terminal 100 via base station 200 according to a media access control (MAC) protocol. In the ARQ operation activated state, before the SDU received by base station 200 in the portable Internet access network is transmitted to mobile terminal 100 according to the MAC protocol, the SDU is divided into ARQ blocks according to an ARQ protocol and is transmitted to mobile terminal 100 through a wireless interface To more reliably control an error, mobile terminal 100 may establish an ARQ operation state when establishing a radio channel with base station 200. After establishing the ARQ operation state, the SDU transmitted through the established radio channel is divided into the ARQ blocks of a predetermined size, and an ARQ block sequence number is respectively allocated to the divided ARQ blocks. Subsequently, the ARQ blocks are transmitted and received according to the allocated ARQ block sequence number. When ARQ data are transmitted from base station 200 to mobile terminal 100, mobile terminal 100 transmits the ARQ block sequence number allocated to the received ARQ blocks to base station 200 to inform base station 200 that the ARQ blocks are received without any error. In addition, when base station 200 does not receive the ARQ block sequence number of the transmitted ARQ blocks or is informed that the transmitted ARQ blocks have errors, base station 200 retransmits the ARQ blocks corresponding to the corresponding ARQ block sequence number. Accordingly, mobile terminal 100 and base station 200 control the ARQ block sequence numbers of the transmitted and received ARQ blocks.

A method for controlling an ARQ operation and recovering data when the handover is performed in the above portable Internet system will be described with reference to FIG. 3.

Figure 3:
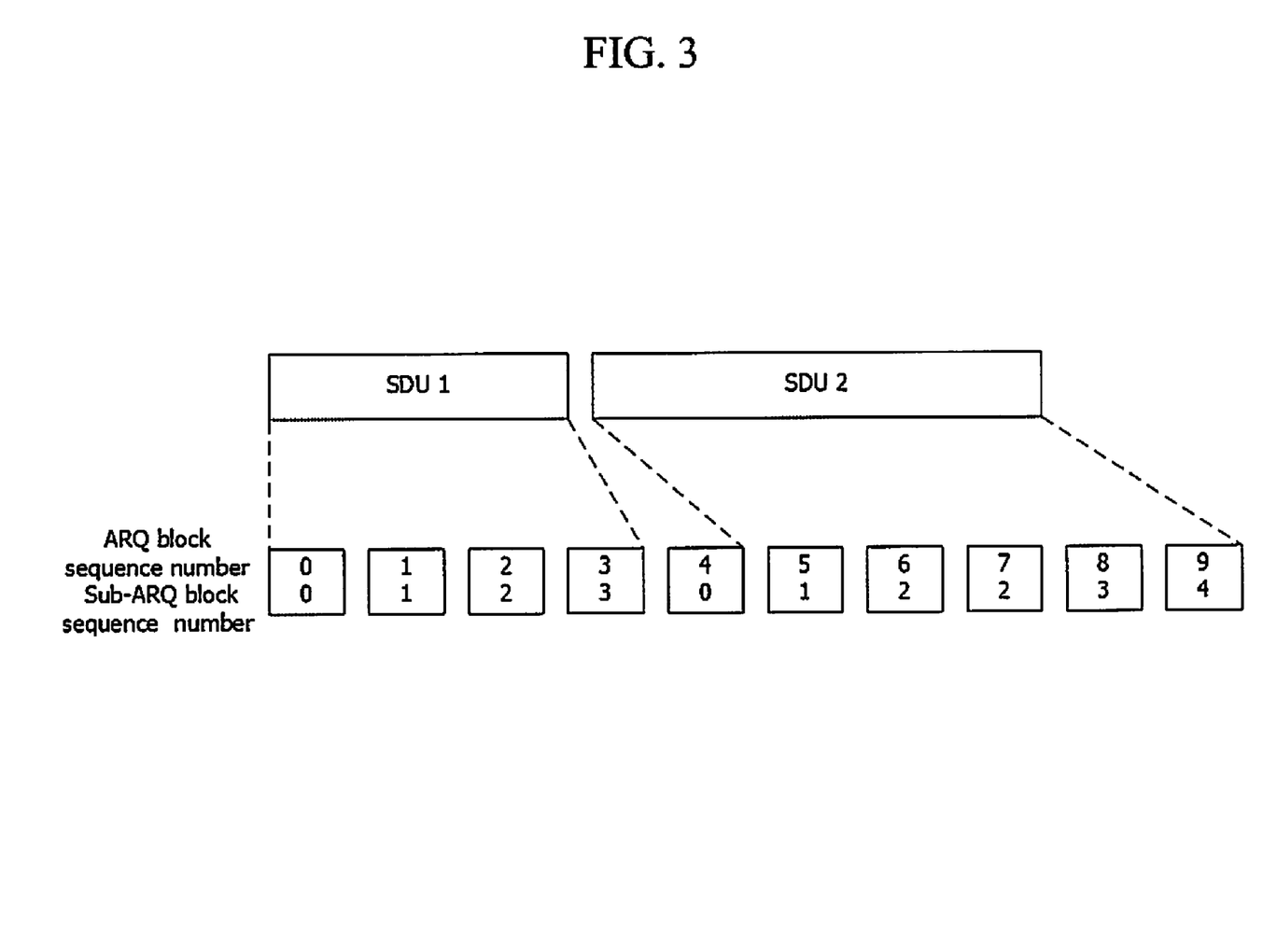
FIG. 3 is a diagram showing the relationship between a Service Data Unit (SDU), an Automatic Repeat reQuest (ARQ) block, an ARQ block sequence number, and a sub-ARQ block sequence number according to the present invention.

FIG. 3 is a diagram showing the relationship between the SDU, the ARQ block, and the ARQ block sequence number according to the present invention. Specifically, FIG. 3 shows the relationship between the SDU, the ARQ blocks, the ARQ block sequence numbers respectively allocated to the ARQ blocks, and the sub-ARQ block sequence numbers. In this case, the ARQ block sequence number and the sub-ARQ block sequence number respectively have a 1-byte length.

The SDU is divided into the ARQ blocks of predetermined size, and in this case, the ARQ block sequence numbers are sequentially allocated to the ARQ blocks. The allocated ARQ block sequence number is increased from 0 by 1 regardless of the corresponding SDU, and the ARQ block sequence number is initialized to be 0 when it becomes 255.

Differing from the ARQ block sequence number, the sub-ARQ block sequence number is increased within the corresponding SDU. Accordingly, an ARQ block sequence number of a fifth ARQ block is 4, and a sub-ARQ block sequence number thereof is 0 since it corresponds to a new SDU.

A method for recovering ARQ data by using the ARQ block sequence number and the SDU receiving the sub-ARQ block sequence number when the handover is performed will be described with reference to FIG. 4A and FIG. 4B.

Figure 4A:
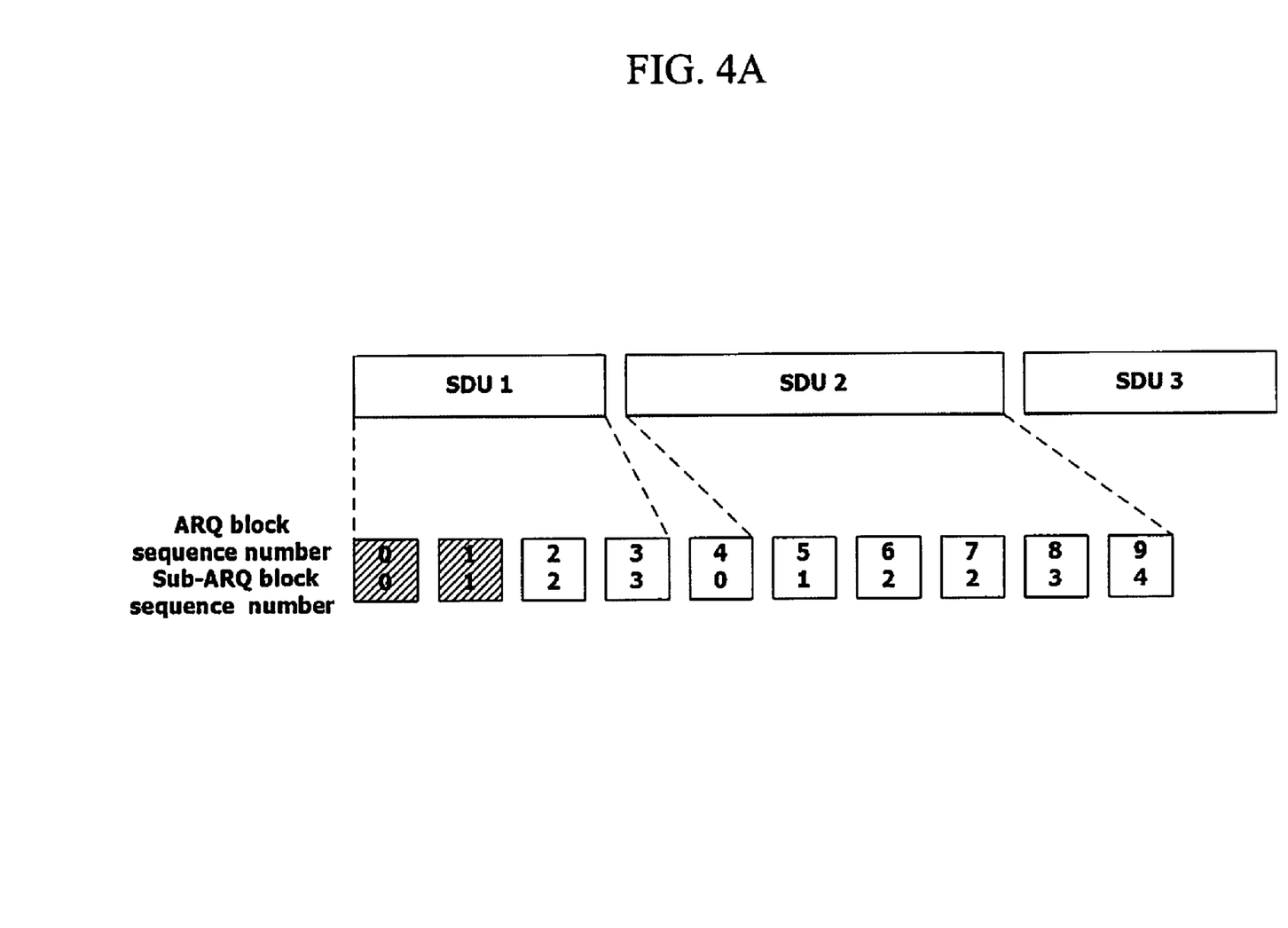
FIG. 4A and FIG. 4B are diagrams showing the relationship between the SDU, the ARQ block, the ARQ block sequence number, and the sub-ARQ block sequence number according to the present invention when the handover is performed.
Figure 4B:
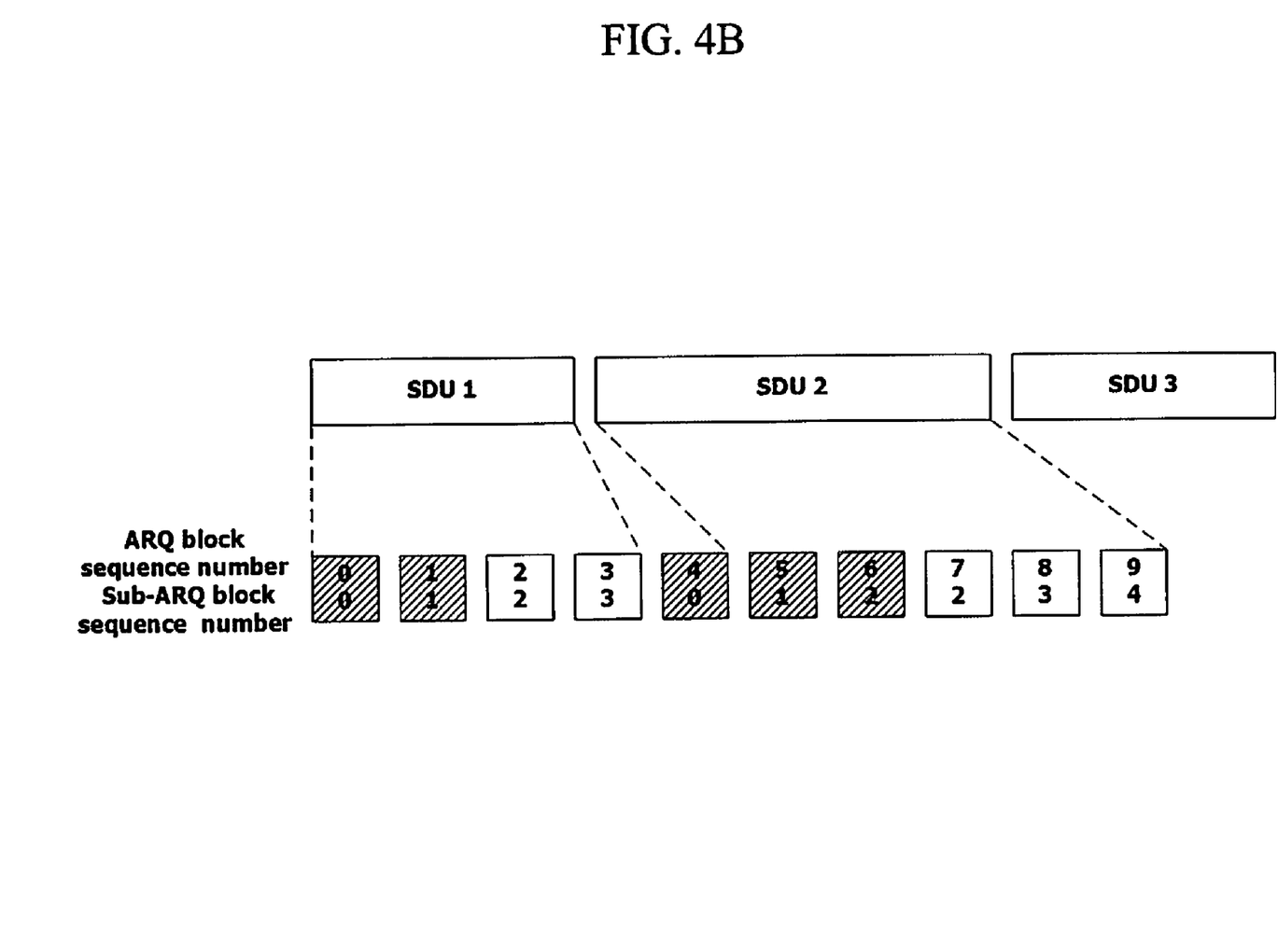

FIG. 4A and FIG. 4B are diagrams showing the relationship between the SDU, the ARQ block, and the ARQ block sequence number according to the present invention when the handover is performed. FIG. 4A shows the case when only the ARQ blocks corresponding to one SDU are transmitted to mobile terminal 100, and FIG. 4B shows the case when some of the ARQ blocks corresponding to a plurality of SDUs are transmitted to mobile terminal 100.

Referring to FIG. 4A and FIG. 4B, the SDU 1 and the SDU2 are divided into ARQ blocks to be transmitted according to the ARQ protocol, and the SDU 3 is not divided into ARQ blocks and is buffered as a SDU format. In addition, the ARQ blocks are illustrated with oblique lines when the ARQ blocks are transmitted to mobile terminal 100 and base station 200 is informed that the ARQ blocks are received in mobile terminal 100, and the ARQ blocks are illustrated without the oblique lines when base station 200 is not informed that the ARQ blocks are received in mobile terminal 100 or the ARQ blocks are not transmitted yet.

As shown in FIG. 4A, when the handover is performed by mobile terminal 100, serving base station 210 transmits the SDU corresponding to the transmitted ARQ blocks, the ARQ block sequence number to be subsequently transmitted, and the sub-ARQ block sequence number corresponding to the corresponding ARQ block to target base station 220 when some of ARQ blocks corresponding to a SDU are already transmitted to mobile terminal 100. Here, SDU1, the ARQ block sequence number 2, and the sub-ARQ block sequence number 2 are transmitted to the target base station 220. Since none of SDU2 is transmitted to mobile terminal 100, SDU2 and SDU3 are transmitted to target base station 220 as a SDU format by an IP routing function.

Target base station 220 divides the received SDU 1 into ARQ blocks, allocates sub-ARQ block sequence numbers to the divided ARQ blocks, and finally allocates the ARQ block sequence numbers to the ARQ blocks of which sub-ARQ block sequence number is greater than the received sub-ARQ block sequence number. In this case, the assigned ARQ block sequence number is increased by 1 from the receive ARQ block sequence number. Because any part of SDU 2 and SDU 3 is never transmitted to mobile terminal 100, the SDU2 and SDU3 are respectively divided into ARQ blocks based on a normal ARQ protocol, and the ARQ block sequence number is sequentially allocated to the ARQ blocks. The first allocated ARQ block sequence number is subsequent to the ARQ block sequence number allocated to the last ARQ block of SDU1. In the case of SDU 3, the ARQ block sequence number corresponding to SDU 3 may be lower than the ARQ block sequence number allocated to SDU 2. That is, the ARQ block sequence number 4 may be allocated to a first ARQ block sequence number of SDU 3, which does not affect the ARQ operation.

As shown in FIG. 4B, SDU1 and SDU2 among the plurality of SDUs cannot be completely transmitted to target base station 220 as an SDU format by the IP routing function. In this case, ARQ information corresponding to the respective SDU is transmitted to target base station 220, and the ARQ blocks are generated in a like manner shown in FIG. 4A.

A method for recovering the ARQ data according to the relationship between the SDU, the ARQ block, and the ARQ block sequence number when the handover is performed will be described with reference to the flow diagram shown in FIG. 5.

Figure 5:
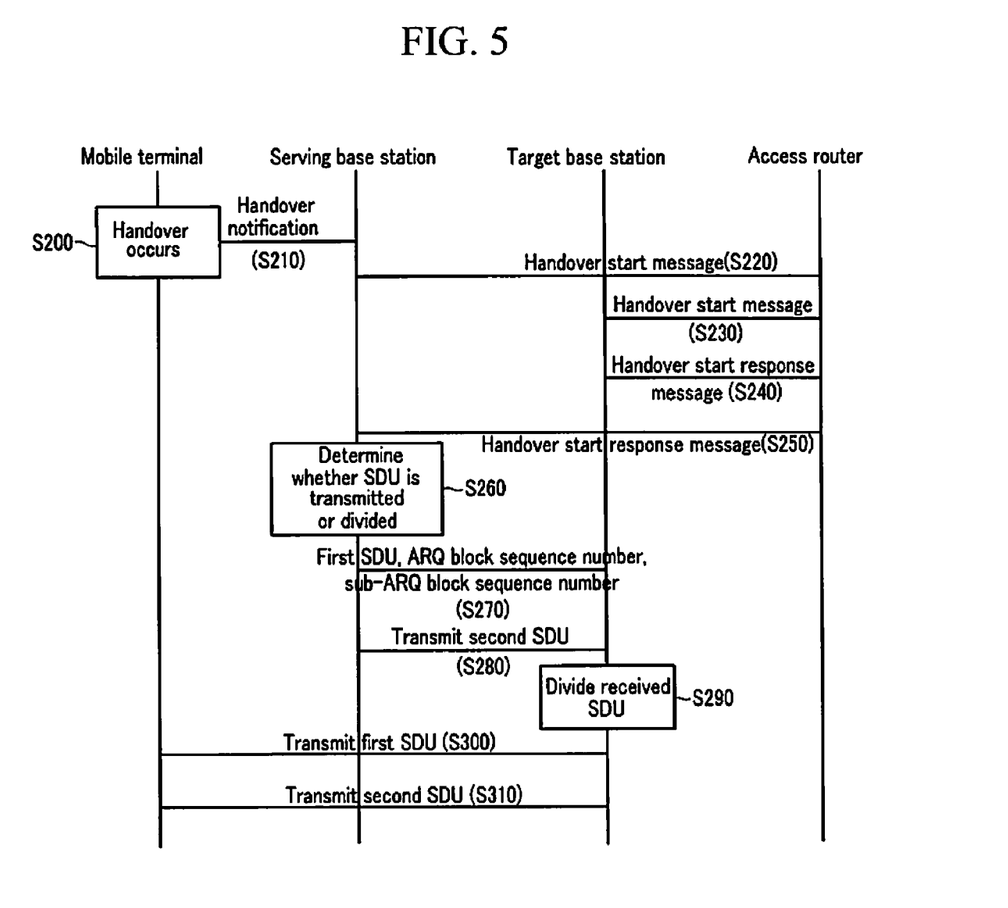
FIG. 5 is a flow diagram showing the ARQ data recovery process in a handover process according to the present invention.

As shown in FIG. 5, when mobile terminal 100 in step S200 performs handover, it transmits information on the handover to serving base station 210 in step S210. Serving base station 210 receiving the information on the handover transmits a handover start message to access router 300 in step S220, and the handover start message and a handover start response message are transmitted and received between access router 300 receiving the handover start message and target base station 220 in steps S230 and S240.

Serving base station 210 receiving the handover start response message from access router 300 in step S250 determines, in step S260, whether a plurality of SDUs to be transmitted to mobile terminal 100 are divided into ARQ blocks, notification of the ARQ block transmitted to mobile terminal 100 without an error is received from mobile terminal 100, the notification is not received from mobile terminal 100, or the ARQ blocks are not transmitted.

Then, for the ARQ blocks of the SDU notified to serving base station 210 (i.e., the SDU1 shown in FIG. 4A), serving base station 210 transmits a first SDU corresponding to the transmitted ARQ blocks, a subsequent ARQ block sequence number 2, and a sub-ARQ block sequence number 2 corresponding to the corresponding ARQ block to target base station 220 in step S270. Subsequently, serving base station 210 transmits a second SDU to target base station 220 via access router 300 using a conventional IP routing protocol in step S280.

Target base station 220 receiving the first SDU corresponding to the already transmitted ARQ blocks, the subsequent ARQ block sequence number, the sub-ARQ block sequence number corresponding to the corresponding ARQ block and the second SDU divides the received SDUs into the ARQ blocks in step S290. The first SDU is divided into the ARQ blocks, the ARQ block sequence number is sequentially allocated from the received ARQ block sequence number to the ARQ blocks after the ARQ block corresponding to the sub-ARQ block sequence number, and the first SDU is transmitted to mobile terminal 100 in step S300. Similar to SDU shown in FIG. 4A, when the last ARQ block transmitted to mobile terminal 100 has the ARQ block sequence number 1, the target base station transmits the divided ARQ blocks to mobile terminal 100 from the ARQ blocks which has the ARQ block sequence number 2 among the ARQ blocks corresponding to the first SDU.

When the first SDU is transmitted, the second SDU is divided into the ARQ blocks. Since any part of the second SDU is not transmitted to mobile terminal 100 by serving base station 210, the ARQ block sequence number is allocated from a number (i.e., 4) that is subsequent to the last number (i.e., 3 shown in FIG. 4A) corresponding to the first SDU among the ARQ block sequence numbers, and the second SDU is transmitted to mobile terminal 100 in step S310.

Regarding SDU 3, the ARQ block sequence number corresponding to SDU 3 may be lower than the ARQ block sequence number allocated to SDU 2. That is, the ARQ block sequence number 4 may be allocated to a first ARQ block sequence number of SDU 3, which does not affect the ARQ operation.

According to the present invention, since ARQ information managed by a serving base station is transmitted to a target base station, ARQ blocks may be retransmitted without an ARQ reset operation, and the handover may be performed without a loss.

In addition, the entire handover delay time may be reduced since the ARQ reset operation is not performed, and overall wireless efficiency may be increased since the transmitted ARQ blocks are not retransmitted.

While this invention has been described in connection with what is presently considered to be practical embodiments, it is to be understood that the invention is not limited to the disclosed embodiments, but, may cover various modifications and equivalent arrangements without departing from the spirit and scope of the invention as further defined by the appended claims.

What is claimed is:

1. A method for recovering Automatic Repeat reQuest (ARQ) data by a target base station when a mobile terminal performs handover from a serving base station to the target base station in a portable Internet system, the method comprising:
   receiving first ARQ data buffered in the serving base station from the serving base station, the first ARQ data including a first service data unit (SDU);
   receiving second ARQ data from the serving base station, the second ARQ data including a second SDU;
   dividing the received first SDU into first ARQ blocks and transmitting at least first one of the first ARQ blocks to the mobile terminal; and
   dividing the received second SDU into second ARQ blocks, and transmitting the second ARQ blocks to the mobile terminal,
   wherein the first ARQ data further comprises an ARQ block sequence number and a sub-ARQ block sequence number that relate to one of the first ARQ blocks that is next to be transmitted to the mobile terminal, as handover from the serving base station to the target base station in the portable Internet system is performed.

2. The method of claim 1, wherein the serving base station transmits at least one of the first ARQ blocks to the mobile terminal after dividing the first SDU into the first ARQ blocks.

3. The method of claim 1, wherein the serving base station divides the second SDU into the second ARQ blocks.

4. The method of claim 3, wherein the second SDU is received from the serving base station using an Internet Protocol (IP) routing function.

5. The method of claim 1, further comprising generating second sub-ARQ block sequence numbers for the second ARQ blocks independently of first sub-ARQ block sequence numbers for the first ARQ blocks.

6. The method of claim 1, further comprising generating second ARQ block sequence numbers for the second SDU subsequent to first ARQ block sequence numbers for the first SDU.

7. The method of claim 1, wherein at least one of the first ARQ blocks has a first ARQ block sequence number that is greater than or equal to the first ARQ block sequence number included in the first ARQ data.

* * * * *